United States Patent

[11] 3,623,951

[72] Inventors Hideo Fukuda
    Takasago;
    Toshihiko Kanzaki, Takarazuka; Hisayoshi Okazaki, Suita; Muneharu Doi, Suita; Masaru Suzuki, Sakai, all of Japan
[21] Appl. No. 525,831
[22] Filed Feb. 8, 1966
[45] Patented Nov. 30, 1971
[73] Assignee Takeda Chemical Industries, Ltd.
    Higashi-ku, Osaka, Japan
[32] Priority Feb. 10, 1965
[33] Japan
[31] 40/7633

[54] METHOD FOR PRODUCING L-GLUTAMIC ACID
    9 Claims, No Drawings
[52] U.S. Cl..................................................... 195/29, 195/47
[51] Int. Cl........................................................ C12d 13/06
[50] Field of Search............................................ 195/47, 29

[56] References Cited
    UNITED STATES PATENTS
    3,362,885  1/1968  Harned.......................... 195/47

Primary Examiner—Lionel M. Shapiro
Attorney—Wenderoth, Lind & Ponack

ABSTRACT: L-glutamic acid is obtained by cultivating *Brevibacterium thiogenitalis* in a culture medium containing an assimilable carbon source, a digestible nitrogen source and inorganic compound, and recovering L-glutamic acid from the culture broth.

METHOD FOR PRODUCING L-GLUTAMIC ACID

This invention relates to a novel method for producing L-glutamic acid by cultivating a micro-organism belonging to *Brevibacterium thiogenitalis* nov. sp.

The present inventors have found that a novel micro-organism isolated from soil by the present inventors accumulates L-glutamic acid abundantly in a culture medium under certain conditions.

The micro-organism isolated by the present inventors has the following characteristics, which are confirmed according to the methods described in the Manual of Microbiological Methods, Society of American Bacteriologists (1957).

I. Microscopic observation (Cultivated for 24 hours at 28° C. on nutrient agar slant.) Small rods, 0.7 to 1.0 by 0.8 to 3.0 microns, occurring singly, in pairs and occasionally in chains of several cells. Nonmotile, no flagella and non-sporulating. Gram-positive, nonacid-fast.

II. Agar slant (Cultivated for 48 hours at 28° C. on nutrient agar) Moderate growth, filiform. Weakly glistening, dull yellowish. Butterlike texture. No soluble pigment produced.

III. Agar colonies (Cultivated for 48 hours at 28° C. on nutrient agar) Circular, entire. Flat, smooth surface. Weakly glistening, dull yellowish.

IV. Nutrient broth (Cultivated for 48 hours at 28° C.) No surface growth. Moderate turbidity and slight sediment. No soluble pigment and odor produced.

V. Gelatin stab (Cultivated for 10 days at 28° C.) Moderate growth on surface. Filiform. No liquefaction. No soluble pigment produced.

VI. Physiological characteristics

1. Temperature relations: Growth at 10° to 37° C., optimum 28° to 37° C. Killed by heating at 60° to 80° C. for 10 minutes.
2. pH relations: Growth at pH 5.0 to 10.0, optimum 6.5 to 9.0.
3. $O_2$ relation: Facultatively anaerobic.
4. Litmus milk: Not coagulated, peptonized and becoming slightly alkaline.
5. Indole: Not produced.
6. Nitrates reduction: Nitrites produced from nitrates.
7. Hydrogen sulfide: Hydrogen sulfide produced strongly. Test medium: peptone 1.0 percent, NaCl 0.5 percent, cystine 0.05 percent. Test method: lead paper method.
8. Methyl red test: Positive.
9. Voges-Proskauer reaction: Negative.
10. Citrate assimilation: Slightly positive.
11. Starch: No liquefaction.
12. Urease activity: Positive.
13. Glucose metabolism (Leifson's method): Acid slightly produced in both cases, aerobically and anaerobically. No gas produced.
14. Ammonium utilization (Tested in Hucker's medium): Negative.
15. Glutamate assimilation: Positive.
    Medium: glucose 1.0 percent, Na-glutamate 0.5 percent, $K_2HPO_4$ 0.1 percent, $MgSO_4 \cdot 7H_2O$ 0.02 percent, KCl 0.01 percent, biotin 10γ/l, vitamin $B_1$ 100γ/l
16. Sugar metabolism: Acid but no gas from glucose, fructose, mannose, sucrose and salicin. No acid and gas from maltose, lactose and other sugars.

Detailed comparison of the above-mentioned characteristics with the descriptions in "The Manual of Determinative Bacteriology," "Amino Acids, Volume 2, page 42 (1960) (Japan)" and "Journal of Agricultural and Chemical Society of Japan, Volume 36, page 141 (1962)" revealed that the micro-organism in the present invention belongs to the family Brevibacteriaceae, judged from such characteristics that it is gram positive; asporogenous; rod shaped; facultatively anaerobic; nonmotile; nonacid-fast; not branching; not isolated from animal or plant; and that it shows no strong polymorphism and heat resistance. There are two genera in the family Brevibacteriaceae, i.e. the genus Brevibacterium and the genus Kurthia. The micro-organism shows no filamentous form at any kinds of cultural conditions and therefore belongs clearly to the genus Brevibacterium. Then the present micro-organism is compared with those considered to resemble in their characteristics. At first, the present micro-organism is compared with similar ones described in "The Manual of Determinative Bacteriology, 7th edition (1957)" in their characteristics, as shown in the following table 1.

TABLE 1

| Strains | Color | Litmus milk | Optimum temperature, °C. | Glutamic acid formation | Habitat | Hydrogen sulfide |
|---|---|---|---|---|---|---|
| *Brevibacterium thiogenitalis* | Dull yellow | Slightly alkaline | 28 to 37 | Strong | Soil | Produced. |
| *Brevierythrogenes* | Yellow | Acid, blood-red in color | 28 to 35 | Unknown | Widely distributed in nature | Do. |
| *Brevifuscum* | Greenish yellow | Slightly acid, becoming alkaline | 20 | do | Water | Unknown. |
| *Brevivitarumen* | Pale lemon yellow | Acid | Unknown | Weak | Rumen | Do. |

It is clear from table 1 that the micro-organism is different from any of the similar micro-organisms described in the reference.

As shown in the following table 2, the present micro-organism is further compared with known L-glutamic acid-producing micro-organisms which are considered to closely resemble thereto.

It is clear from table 2 that the present micro-organism is quite different in maltose assimilation and producibility of hydrogen sulfide and other characteristics from any of the known L-glutamic acid-producing micro-organisms listed in table 2. When the present micro-organism is cultivated in a culture medium containing 1 percent of peptone solution, 0.5 percent of sodium chloride and 0.05 percent of cystine, it produces strongly hydrogen sulfide which can be detected by a so-called lead paper method described in the descriptive chart of "The Manual of Microbiological Method."

As regards producibility of hydrogen sulfide by known L-glutamic acid-producing micro-organisms, these are described in "Amino Acids, Volume 2, page 42 (1960) (Japan)" and "Journal of Agricultural and Chemical Society of Japan, Volume 36, page 141 (1962)." But none of the known L-glutamic acid-producing micro-organisms belonging to genus Brevibacterium has been found to produce hydrogen sulfide which is detectable by the lead paper method. Thus, the present micro-organism is concluded to be classified as a novel species belonging to genus Brevibacterium, and named as *Brevibacterium thiogenitalis* No. 594 by the present inventors.

The method of this invention comprises cultivating the novel micro-organism belonging to *Brevibacterium thiogenitalis* in a culture medium containing assimilable carbon sources, digestible nitrogen sources and inorganic compounds necessary for the growth of the micro-organism until a substantial quantity of L-glutamic acid is produced and recovering the L-glutamic acid therefrom.

Micro-organisms employed in this invention may, for example, be *Brevibacterium thiogenitalis* No. 594 (ATCC No. 19240) and mutants or variants thereof.

The assimilable carbon sources may, for example, be glucose, starch hydrolyzate, sucrose, black strap molasses, fructose, etc. The digestible nitrogen sources may, for example, be ammonium sulfate, ammonium chloride, urea, ammonium

TABLE 2

Characteristics

| Strains | Morphology | Size (microns) | Color | Litmus milk | Type of colonies | H₂S production | Ammonium utilization in Hucher's medium | Mannose assimilation | Lactose assimilation | Xylose assimilation | Maltose assimilation |
|---|---|---|---|---|---|---|---|---|---|---|---|
| Brevibacterium thiogenitalis | Short rods | 0.7 to 3.0 | Dull yellow | Slight alkaline | Flat | Positive | Negative | Positive | Negative | Negative | Negative |
| Micrococcus glutamicus | Coccoid | 0.6 to 1.2 | Milky yellow to faint yellow | Netural to alkaline | Slightly raised | Negative | do | do | do | Obscure | Positive |
| Brevibacterium kawasaki | Ellipsoidal to rod-shaped | 1.2 to 4.3 | Dull yellow to pale yellowish green | do | Raised | do | Positive | Unknown | do | Unknown | Unknown |
| Brevibacterium flavum | Short rods | 0.5 to 2.0 | Yellow | Alkaline | do | do | do | Negative | do | Negative | Positive |
| Brevibacterium aquapele | Ellipsoidal | 0.8 to 2.5 | do | do | do | do | do | Positive | do | do | Do. |
| Brevibacterium lactofermentum | Short rods | 0.5 to 1.5 | do | Acid decolorized | do | do | do | do | Positive | Positive | Do. | acetate, aqueous ammonia solution, etc. The inorganic compounds may, for example, be salts of phosphoric acid (e.g. sodium phosphate, potassium phosphate, etc.) and magnesium sulfate. The cultivation is preferably carried out in aerobic condition under shaking or agitation, but the latter is more preferable for an industrial purpose. Cultivation temperature is generally about 25° C. to about 35° C. and preferably about 28° C. to about 32° C. pH of the culture medium is generally about 6.6 to about 8.7, and preferably 6.8 to 7.2. Cultivation time is generally about 24 hours to about 60 hours. Recovering of L-glutamic acid from the culture solution can be effected by per se known means; for example, the culture solution is filtered to remove mycelia, and the filtrate is concentrated and pH of the concentrate is adjusted to about 3.2, whereby L-glutamic acid precipitates out as crystals.

The method of this invention makes it very convenient to operate cultivation of the micro-organism due to the fact that L-glutamic acid fermentation can be effected at a wide range of pH between about 6.6 and about 8.7. Moreover, a parameter of Kd of a micro-organism employed in the method of this invention is about $0.8-2.0 \times 10^{-6}$ g. mole·O₂/milliliter·minute·atom, while the Kd of known L-glutamic acid-producing micro-organisms is about $5 \times 10^{-6}$ g. mole·O₂/milliliter·minute·atom. That is to say, the agitating power required in the present method is much smaller than that of known methods. It is needless to say that a low agitating power for fermentation is much advantageous from industrial viewpoints.

In view of industrial purposes, it is preferable in the method of this invention that the culture medium contains a natural nutrient source or sources such as corn steep liquor, molasses (e.g. beet molasses, cane molasses) and hydrolyzate of starch (e.g. hydrolyzate of potato, sweet potato starch). In case of employing such a culture medium containing a natural nutrient source or sources, abundant growth of the micro-organism is easily attained, but the use of too much amount of the natural nutrient source is apt to lessen the L-glutamic acid producibility of the micro-organism. This lessening of the producibility appears to be mainly due to the amount of biotin contents in the medium. According to the present inventors' observation, when the biotin content of such culture medium is over about 2 to about 3 γ per milliliter, especially over about 5 to about 6 γ per milliliter, though it depends on other cultural conditions, it is preferable to add a persulfate compound to the culture medium, whereby yield of L-glutamic acid is considerably increased. The persulfate compound may, for example, be sodium persulfate, potassium persulfate and ammonium persulfate. And the amount of the persulfate to be added is about 2,000 to about 20,000 γ per milliliter.

In the method of this invention, when no natural substance is employed as a component of the culture medium, that is to say, when a synthetic culture medium is employed, it is preferable to add to the culture medium at least one compound selected from pyrimidine compounds, thiazole compounds, disulfide compounds. These pyrimidine-, thiazole- and disulfide compounds may, for example, be
5-hydroxyethyl-4-methylthiazole,
5-carboxy-4-methylthiazole,
4-amino-2,5-dimethylpyrimidine,
4-amino-5-hydroxymethyl-2-methylpyrimidine,
4-amino-5-aminomethyl-2-methylpyrimidine,
4-amino-5-aminomethyl-2-hydroxyethylpyrimidine,
Bis(2-methyl-4-aminopyrimidine-5-yl-methyl)disulfide,
2-methyl-4-hydroxy-5-aminomethylpyrimidine,
2-methyl-4-methylamino-5-hydroxymethylpyrimidine,
2-hydroxy-7-methyl-1,3,6,8-tetrazanaphthalene,
Bis[(2-methyl-3-hydroxy-4-hydroxymethylpyridine-5-yl)methyl]disulfide,
Bis[(2-methyl-3-hydroxy-5-hydroxymethylpyridine-4-yl)methyl]disulfide,
(2-methyl-3-hydroxy-4-hydroxymethyl-5-benzyl-dithiomethyl)pyridine,
(2-benzoylamino)ethyl-benzyl-disulfide, Bis(2-benzoylamino)ethyl disulfide,
di(phenylmethyl)disulfide,
β-(methyldithio)alanine,
β-(allyldithio)alanine,
Bis[(2-carboxy-2-benzylcarbonyloxyamino)ethyl]disulfide and Bis[(3-carboxy-5-nitro)phenyl]disulfide.

The preferable amount of the pyridine-, thiazole- and disulfide compound is about 0.1 to about 100 γ per milliliter.

EXAMPLE 1

A medium containing 10 percent of glucose, 1.5 percent of urea, 0.3 percent of corn steep liquor, 0.1 percent of $KH_2PO_4$, and 0.05 percent of $MgSO_4$ is prepared. Into several 200-milliliter conical flasks, 20-milliliter portions of the medium are introduced. All the flasks were sterilized, then Brevibacterium thiogenitalis No. 594 (ATCC No. 19240) is inoculated. The cultivation is carried out at 28° C. for 3 days by the use of a rotary shaker of 200 revolutions per minute. At 24 hours and 48 hours after starting the cultivation, 0.7 percent each of urea is added to the respective flasks, then the cultivation is further carried on. After 64 hours, the culture broth is assayed by means of turbidimetric method employing Lactobacillus arabinosus to find 45 milligrams per milliliter of L-glutamic acid accumulated in the culture broth. One hundred milliliters of the culture broth is collected and subjected to filtration to remove mycelia. The filtrate then obtained is concentrated under reduced pressure. The concentrate is adjusted to a pH value at 3.2, followed by being left standing, whereby 3.8 grams of first crystals of L-glutamic acid are obtained.

EXAMPLE 2

Thirty liters of seed culture medium, containing 2 percent of glucose, 0.5 percent of urea, 0.1 percent of $KH_2PO_4$, 0.04 percent of $MgSO_4$ and 0.5 percent of corn steep liquor, sterilized in a 50-liter fermenter, is inoculated with 0.5 liter of the seed culture obtained by preincubation of Brevibacterium thiogenitalis No. 594 (ATCC No. 19240) under shaking for 24 hours in a 2-liter Sakaguchi's flask, followed by seed cultivation for 18 hours under aeration of 15 liters per minute with agitation of 150 revolutions per minute.

On the other hand, a sterilized main culture medium, containing 12 percent of glucose, 1.0 percent of urea, 0.1 percent of $KH_2PO_4$, 0.05 percent of $MgSO_4$ and 0.3 percent of corn steep liquor, is inoculated aseptically with 5 liters of the above-mentioned seed culture solution in a 200-liter fermenter, followed by cultivation for 60 hours at a temperature of 30° ± 0.5° C. under stirring (150 revolutions per minute) with aeration of 15 liters per minute, while adding dropwise a small amount of silicon oil when vigorous foaming occurs. Then the culture broth is subjected to filtration to remove mycelia. From the filtrate 4.52 kilograms of the first crystals of L-glutamic acid is obtained by conventional means. The content of L-glutamic acid in the culture broth at the final stage of cultivation is 58 milligrams per milliliter when quantitatively determined by the method employed in example 1.

EXAMPLE 3

Two kinds of main culture media, one of which contains 10 percent of hydrolyzate of sweet potato starch, 0.3 percent of corn steep liquor, 1.5 percent of urea, 0.1 percent of $KH_2PO_4$ and 0.04 percent of $MgSO_4$, and the other of which contains 0.5 percent of sodium persulfate in addition to the above composition, are prepared. One milliliter each of the seed culture which is prepared by culturing Brevibacterium thiogenitalis No. 594 (ATCC No. 19240) in the seed culture medium containing 2 percent of glucose, 0.5 percent of corn steep liquor, 0.5 percent of urea, 0.1 percent of $KH_2PO_4$ and 0.04 percent of $MgSO_4$, is incubated in 20 milliliters each of the before-prepared main culture media in conical flasks of 200 milliliters capacity, and the main cultivation is carried out at 28° C. for 48 hours with the addition of 0.7 percent of urea at 18 hours and at 34 hours after the cultivation starts. The amount of L-glutamic acid obtained from the culture solution by conventional means is 23.5 grams when sodium persulfate is not contained in the main culture media, i.e. when the latter is employed, and 36.0 grams when sodium persulfate is contained, i.e. when the former is employed.

EXAMPLE 4

The same procedure as in example 3 with the exception of use of 0.5 percent of ammonium persulfate in place of sodium persulfate is carried out. The amount of L-glutamic acid obtained is 25.0 grams when ammonium persulfate is not employed, and 34.6 grams when ammonium persulfate is employed.

EXAMPLE 5

Two kinds of main culture media, one of which contains 5 percent (as sugar) of beet molasses, 0.3 percent of corn steep liquor, 0.8 percent of urea, 0.1 percent of $KH_2PO_4$ and 0.04 percent of $MgSO_4$, and the other of which contains 0.5 percent of sodium persulfate in addition to the above composition, are prepared. One milliliter each of seed culture prepared as in example 3 is transplanted to 20 milliliters each of the two kinds of the before-prepared main culture media, and the main cultivation is carried out at 28° C. for 48 hours. In the main culture solution not containing sodium persulfate, no L-glutamic acid is substantially produced, but in the main culture solution containing sodium persulfate, 19 milligrams per milliliter of L-glutamic acid is accumulated. And from 1 liter of the main culture solution containing sodium persulfate, 14.8 grams of crystalline L-glutamic acid are obtained by conventional means.

EXAMPLE 6

The same procedure as in example 3 with the exception of use of ammonium persulfate in place of sodium persulfate is carried out. L-glutamic acid is obtained in an amount of 18.0 grams from the main culture medium containing ammonium persulfate, while no L-glutamic acid is substantially obtained in the main culture solution not containing ammonium persulfate.

EXAMPLE 7

Two kinds of main culture media, one of which contains 10 percent of glucose, 1.5 percent of urea, 0.1 percent of $KH_2PO_4$, 0.04 percent of $MgSO_4 \cdot 7H_2O$ and 2 γ per liter of biotin and the other of which contains 0.1 γ per milliliter of 5-carboxy-4-methylthiazole in addition to the above components, are prepared. One milliliter each of seed culture, which is prepared by culturing Brevibacterium thiogenitalis No. 594 in a seed culture medium containing 2 percent of glucose, 0.3 percent of corn steep liquor, 0.5 percent of urea, 0.1 percent of $KH_2PO_4$ and 0.04 percent of $MgSO_4 \cdot 7H_2O$ at 28° C. for 18 hours, is transplanted to 20 milliliters of the respective main culture media in conical flasks, and the main cultivation is carried out at 28° C. for 60 hours with the addition of 0.7 percent of urea at 20 hours and 40 hours after the cultivation starts in order to raise the pH of the media as well as to supply a nitrogen source. From 1 liter of the culture solution containing 5-carboxy-4-methyl-thiazole, 38.0 grams of L-glutamic acid is obtained by conventional means. On the contrary, no L-glutamic acid is substantially obtained from the culture solution not containing 5-carboxy-2-methyl-thiazole.

EXAMPLE 8

Two kinds of main culture media, one of which contains 10 percent of glucose, 1.5 percent of urea, 0.1 percent of $KH_2PO_4$, 0.04 percent of $MgSO_4 \cdot 7H_2O$ and 2 γ per liter of biotin, and the other of which contains 0.1 γ per milliliter of 2-methyl-4-amino-5-aminomethylpyrimidine in addition to the above components, are prepared. One milliliter each of seed culture, which is prepared by culturing Brevibacterium

*thiogenitalis* No. 594 in seed culture medium containing 2 percent of glucose, 0.3 percent of corn steep liquor, 0.5 percent urea, 0.1 percent of $KH_2PO_4$ and 0.04 percent of $MgSO_4 \cdot 7H_2O$ at 28° C. for 18 hours, is transplanted into 20 milliliters of the respective main culture media, and the main cultivation is carried out at 28° C. for 60 hours with the addition of 0.7 percent of urea at 20 hours and at 40 hours after the cultivation starts in order to raise the pH of the media as well as to supply the media with a nitrogen source. From 1 liter of the culture solution containing 2-methyl-4-amino-5-aminomethylpyrimidine 38.0 grams of L-glutamic acid is obtained by conventional means, while no L-glutamic acid is substantially obtained from the culture solution not containing 2-methyl-4-amino-5-aminomethylpyrimidine.

EXAMPLE 9

A seed culture medium containing 2 percent of glucose, 0.5 percent of urea, 0.1 percent of $KH_2PO_4$, 0.04 percent of $MgSO_4 \cdot 7H_2O$ and 0.3 percent of corn steep liquor is poured into fermentor of 50 liters content and sterilized by conventional means to make its final volume 30 liters. The precultivation of *Brevibacterium thiogenitalis* No. 594 (ATCC No. 19240) by Sakaguchi's flask is inoculated into the seed culture medium and the seed cultivation is carried out at 28° C. for 18 hours.

On the other hand, 100 liters of main culture medium containing 13 percent of glucose, 1.0 percent of urea, 0.3 percent of $KH_2PO_4$, 0.05 percent of $MgSO_4 \cdot 7H_2O$, 2 γ per liter of biotin and 0.1 γ per milliliter of 2-methyl-4-amino-5-aminomethylpyrimidine are poured into the fermentor of 200 liters content. Five liters of the before-prepared seed culture solution are transplanted to the main culture medium and the main cultivation is carried out at 30° C. for 50 hours with aeration of 15 liters per minute and an agitation of 150 revolutions per minute. Under such cultural conditions Kd equals $1.1 \times 10^{-6}$ g. mole·$O_2$ per milliliter·minute·atom. Until the cultivation is completed, aqueous ammonia solution is added to the main culture medium in proper amount in order to adjust the pH of the medium between 6.8 and 7.4. After the cultivation is completed, 62 milligrams per milliliter of L-glutamic acid is accumulated in the main culture solution. From the main culture solution 5.02 kilograms of the first crystals of L-glutamic acid are obtained by conventional means.

EXAMPLE 10

Two kinds of main culture media are prepared, one of which contains 10 percent of glucose, 1.5 percent of urea, 0.1 percent of $KH_2PO_4$, 0.04 percent of $MgSO_4 \cdot 7H_2O$ and 2 γ per liter of biotin, and the other of which contains 10 γ per milliliter of Bis[(2-methyl-3-hydroxy-4-hydroxymethyl-pyridine-5-yl)methyl]disulfide (this compound is referred to as compound (I) for short). One milliliter of seed culture, which is prepared by culturing *Brevibacterium thiogenitalis* No. 594 (ATCC No. 19240) in the seed culture medium containing 2 percent of glucose, 0.3 percent of corn steep liquor, 0.5 percent of urea, 0.1 percent of $KH_2PO_4$ and 0.04 percent of $MgSO_4 \cdot 7H_2O$, is transplanted to 20 milliliters of the respective main culture medium in conical flasks of 200 milliliters content and the main cultivation is carried out at 28° C. for 60 hours with the addition of 0.7 percent of urea at 20 hours and 40 hours after the cultivation starts in order to raise the pH of the medium as well as to supply the media with nitrogen source.

From the main culture solution containing the compound (I), 39.5 grams of L-glutamic acid is obtained by usual means. On the contrary, from the main culture solution not containing the compound (I), no L-glutamic acid is substantially obtained.

EXAMPLE 11

The same procedure as in example 10 with the exception of use of 100 γ per milliliter of benzyldithiomethylbenzene (this compound is referred to as compound (II) for short) in place of the compound (I) is carried out. From 1 liter of the main culture solution containing the compound (II), 32 grams of L-glutamic acid is obtained. But from the culture solution not containing the compound (II), no L-glutamic acid is substantially obtained.

What we claim is:

1. A method for producing L-glutamic acid which comprises cultivating a micro-organism belonging to *Brevibacterium thiogenitalis* in a culture medium containing an assimilable carbon source and a digestible nitrogen source and an inorganic compound necessary for the growth of the micro-organism until a substantial quantity of L-glutamic acid is produced, and recovering L-glutamic acid from the culture.

2. A method as claimed in claim 1 wherein the medium contains persulfate and at least one nutrient source selected from the group consisting of corn steep liquor, molasses and hydrolyzate of starch.

3. A method as claimed in claim 1 wherein the medium is a synthetic medium containing at least one compound selected from the group consisting of pyrimidine compound, thiazole compound and disulfide compound.

4. A method as claimed in claim 1 wherein the micro-organism is *Brevibacterium thiogenitalis* No. 594 (ATCC No. 19240).

5. A method as claimed in claim 2 wherein the micro-organism is *Brevibacterium thiogenitalis* No. 594 (ATCC No. 19240).

6. A method as claimed in claim 3 wherein the micro-organism is *Brevibacterium thiogenitalis* No. 594 (ATCC No. 19240).

7. A method as claimed in claim 2 wherein the persulfate is sodium persulfate, potassium persulfate or ammonium persulfate.

8. A method as claimed in claim 7 wherein the amount of the perfulfate is about 2,000 to about 20,000 γ per milliliter of the culture medium.

9. A method as claimed in claim 3 wherein the amount of the compound is about 0.1 to about 100 γ per milliliter of the culture medium.

* * * * *